(12) United States Patent
Xing et al.

(10) Patent No.: US 11,228,418 B2
(45) Date of Patent: Jan. 18, 2022

(54) REAL-TIME EYE DIAGRAM OPTIMIZATION IN A HIGH SPEED IO RECEIVER

(71) Applicant: International Business Machines Corporation, Armonk, NY (US)

(72) Inventors: Xiao Di Xing, Beijing (CN); Zhen Peng Zuo, Shanghai (CN); Yang Xiao, Xi'an (CN); Xu Guang Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 16/206,621

(22) Filed: Nov. 30, 2018

(65) Prior Publication Data

US 2020/0175299 A1 Jun. 4, 2020

(51) Int. Cl.
| | |
|---|---|
| *H04B 1/10* | (2006.01) |
| *H04L 7/00* | (2006.01) |
| *G06K 9/32* | (2006.01) |
| *H04L 25/03* | (2006.01) |
| *H04L 7/033* | (2006.01) |

(52) U.S. Cl.
CPC ............. *H04L 7/0075* (2013.01); *G06K 9/32* (2013.01); *H04L 7/0045* (2013.01); *H04L 7/0087* (2013.01); *H04L 7/033* (2013.01); *H04L 25/03* (2013.01); *H04L 25/03012* (2013.01); *G06K 2009/3291* (2013.01)

(58) Field of Classification Search
CPC .................. H04L 7/0075; H04L 7/0045; H04L 7/0087; H04L 7/033; H04L 25/03; H04L 25/03012; G06K 9/32; G06K 2009/3291

USPC ................................. 375/232, 355, 359, 360
See application file for complete search history.

(56) References Cited

U.S. PATENT DOCUMENTS

| | | |
|---|---|---|
| 6,519,302 B1 | 2/2003 | Bruce et al. |
| 6,731,683 B1 | 5/2004 | Fiedler et al. |
| 6,871,304 B2 | 3/2005 | Hadjihassan et al. |
| 7,490,275 B2 | 2/2009 | Zerbe et al. |

(Continued)

OTHER PUBLICATIONS

Sen Lin, "Electronic-Photonic Co-Design of Silicon Photonic Interconnects" University of California, Berkeley, 2017 [<https://www2.eecs.berkeley.edu/Pubs/TechRpts/2017/EECS-2017-208.pdf>)].

*Primary Examiner* — Don N Vo
(74) *Attorney, Agent, or Firm* — Patterson + Sheridan, LLP (57) ABSTRACT

A example receiver includes analog circuitry configured to equalize and amplify an input signal and provide an analog signal as output; clock data recovery (CDR) circuitry configured to recover data clocks and edge clocks from the analog signal; a plurality of eye height optimization circuits, each of the plurality of eye height optimization circuits configured to, based on a respective data pattern of a plurality of data patterns, sample the analog signal based on the data clocks and the edge clocks, feed back first information to the analog circuitry for adjusting the eye amplitude, and feed back second information to the CDR circuitry for adjusting the data clocks; and an eye width optimization circuit configured to receive data and edge samples from the plurality of eye height optimization circuits, feed back third information to the CDR circuitry to adjust the edge clocks, and feed back fourth information to the analog circuitry to adjust the equalization.

20 Claims, 6 Drawing Sheets

(56) References Cited

U.S. PATENT DOCUMENTS

| | | | |
|---|---|---|---|
| 8,654,830 B1* | 2/2014 | Lin | H04L 25/03057 |
| | | | 375/233 |
| 9,148,315 B1 | 9/2015 | Qian et al. | |
| 9,160,582 B1* | 10/2015 | Huss | H03L 7/089 |
| 9,325,536 B2 | 4/2016 | Patel et al. | |
| 9,397,872 B2 | 7/2016 | Kamali | |
| 9,618,965 B2 | 4/2017 | Kumar et al. | |
| 2010/0097087 A1* | 4/2010 | Hogeboom | G01R 31/31711 |
| | | | 324/750.3 |
| 2010/0329322 A1 | 12/2010 | Mobin et al. | |
| 2014/0269881 A1 | 9/2014 | He et al. | |
| 2019/0268188 A1* | 8/2019 | Farjad-Rad | H04L 25/03885 |

* cited by examiner

REAL-TIME EYE DIAGRAM OPTIMIZATION IN A HIGH SPEED IO RECEIVER

BACKGROUND

The present invention relates to electronic circuits, and more specifically, to real-time eye diagram optimization in a high speed input/output (IO) receiver.

Eye optimization plays an important role in high-speed IO (HSIO) systems to combat environmental change and channel decay and to minimize bit error rate (BER) during functional data transfer. Eye optimization can be performed after the initial data link has been established. An eye optimization subsystem in the HSIO system attempts to widen the data eye of corrupted and distorted IO signals by measuring signal properties and adjusting analog circuit parameters. The eye optimization subsystem can take into account various parameters, including amplitude, offset, inter-symbol interference (ISI) canceling, sampling point centering, and high-frequency loss compensation.

One technique for eye optimization attempts to minimize the root mean square (RMS) of decision errors through optimization of parameters. The errors are collected from samplers positioned at the top, bottom and edge of the expected data eye. When optimal parameters are achieved, the data eye is opened beyond the samplers' positions. The disadvantage with this technique is that the technique does not consider compensations of offsets resulting from the analog data path, the samplers, as well as the interfered signal itself. In addition, the calculation of RMS poses a heavy burden on digital power and making the technique difficult or impossible to deploy in real-time applications.

SUMMARY

According to one embodiment of the present invention, a receiver includes: analog circuitry configured to equalize and amplify an input signal and provide an analog signal as output; clock data recovery (CDR) circuitry configured to recover data clocks and edge clocks from the analog signal; a plurality of eye height optimization circuits, each of the plurality of eye height optimization circuits configured to, based on a respective data pattern of a plurality of data patterns, sample the analog signal based on the data clocks and the edge clocks, feed back first information to the analog circuitry for adjusting the eye amplitude, and feed back second information to the CDR circuitry for adjusting the data clocks; and an eye width optimization circuit configured to receive data and edge samples from the plurality of eye height optimization circuits, feed back third information to the CDR circuitry to adjust the edge clocks, and feed back fourth information to the analog circuitry to adjust the equalization.

According to another embodiment of the present invention, a serial communication system includes: a transmitter; a transmission medium coupled to the transmitter; and a receiver coupled to the transmission medium to receive an input signal from the transmitter. The receiver includes: analog circuitry configured to equalize and amplify the input signal and provide an analog signal as output; clock data recovery (CDR) circuitry configured to recover data clocks and edge clocks from the analog signal; a plurality of eye height optimization circuits, each of the plurality of eye height optimization circuits configured to, based on a respective data pattern of a plurality of data patterns, sample the analog signal based on the data clocks and the edge clocks, feed back first information to the analog circuitry for adjusting the eye amplitude, and feed back second information to the CDR circuitry for adjusting the data clocks; and an eye width optimization circuit configured to receive data and edge samples from the plurality of eye height optimization circuits, feed back third information to the CDR circuitry to adjust the edge clocks, and feed back fourth information to the analog circuitry to adjust the equalization.

According to another embodiment of the present invention, a method of receiving an input signal at a receiver includes: equalizing and amplifying, at analog circuitry, the input signal to provide an analog signal as output; recovering, at CDR circuitry, data clocks and edge clocks from the analog signal; sampling the analog signal based on the data clocks and the edge clocks using a plurality of eye height optimization circuits each based on a respective data pattern of a plurality of data patterns; providing, from the plurality of eye height optimization circuits, first information to the analog circuitry for adjusting the eye amplitude, and second information to the CDR circuitry for adjusting the data clocks; receiving, at eye width optimization circuitry, data and edge samples from the plurality of eye height optimization circuits; and providing, from the eye width optimization circuit, third information to the CDR circuitry to adjust the edge clocks, and fourth information to the analog circuitry to adjust the equalization.

DETAILED DESCRIPTION

Figure 1:
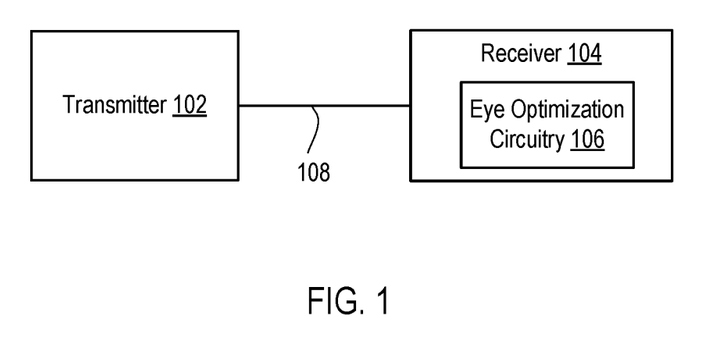
FIG. 1 is a block diagram depicting an example of a serial communication system according to an embodiment.

FIG. 1 is a block diagram depicting an example of a serial communication system 100 according to an embodiment. The serial communication system 100 comprises a transmitter 102 coupled to a receiver 104 over transmission medium 108. The transmission medium 108 comprises an electrical path between the transmitter 102 and the receiver 104 and can include printed circuit board (PCB) traces, vias, cables, connectors, decoupling capacitors, and the like. The transmitter 102 drives serial data onto the transmission medium 108 using a digital baseband modulation technique. In general, the serial data is divided into symbols. The transmitter 102 converts each symbol into an analog voltage mapped to the symbol. The transmitter 102 couples the analog voltage generated from each symbol to the transmission medium 108. In some examples, the transmitter 108 uses a binary non-return-to-zero (NRZ) modulation scheme. In binary NRZ, a symbol is one bit of the serial data and two analog voltages are used to represent each bit.

The receiver 104 includes eye optimization circuitry 106. The eye optimization circuitry 106 is configured to enhance data integrity at the receiver 104. The eye optimization circuitry 106 provides for real-time and resource efficiency. The eye optimization circuitry 106 takes all measures for eye optimization simultaneously. The eye optimization circuitry 106 executes eye optimization alongside data transmission in real time. The eye optimization circuitry 106 does not require any spare banks or lanes, which reduces power consumption. Further, the eye optimization circuitry 106 tracks latent jitters and distortions in full time, avoiding interactions between steps in conventional eye optimization techniques. In an embodiment, the eye optimization circuitry 106 provides a golden framework for all possible data patterns as adjustment criteria. Offsets stemming from the sampling latches and the data path, amplitude attenuation, and intersymbol interference (ISI) are not distinguished, rather compensated as a whole, which reduces control complexity. The eye optimization circuitry 106 optimizes eye width through clock phase differences, which provides for reduced complexity. The eye optimization circuitry 106 also provides for individual tuning of the eye center for each data pattern to achieve theoretically minimum data error. Finally, the eye optimization circuitry 106 provides for individual tuning of data amplitude for each data pattern to achieve optimal signal height for all types of patterns.

Figure 2:
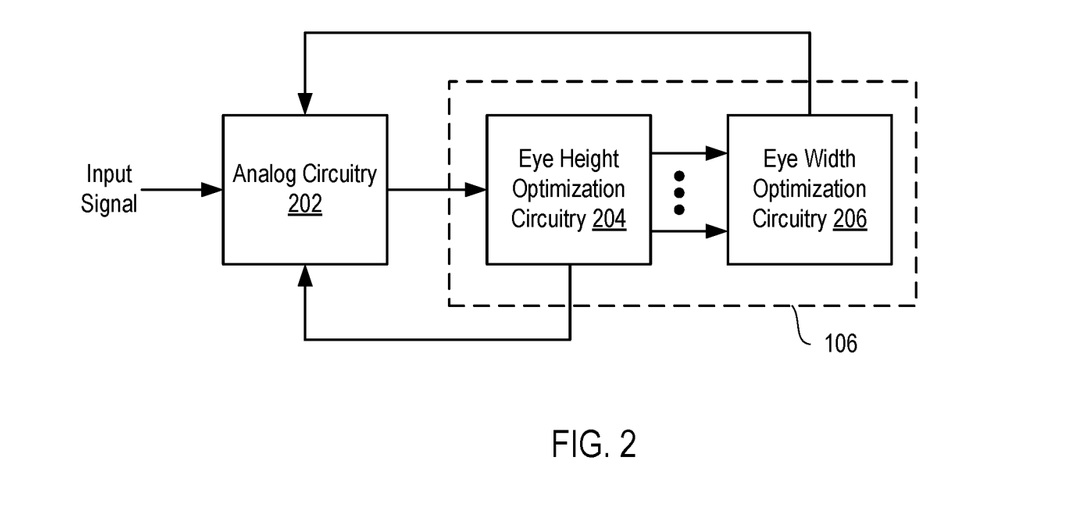
FIG. 2 is a block diagram depicting a receiver according to an embodiment.

FIG. 2 is a block diagram depicting the receiver 104 according to an embodiment. The receiver 104 includes analog circuitry 202 and the eye optimization circuitry 106. The eye optimization circuitry 106 includes eye height optimization circuitry 204 and eye width optimization circuitry 206. The analog circuitry 202 is configured to receive the input signal from the transmission medium 108. A data output of the analog circuitry 202 is coupled to a data input of the eye height optimization circuitry 204. Data outputs of the eye height optimization circuitry 204 are coupled to data inputs of the eye width optimization circuitry 206. Control outputs of the eye height optimization circuitry 204 and eye width optimization circuitry 206 are coupled to control inputs of the analog circuitry 202. The analog circuitry 202 is configured to provide analog equalization and amplification of the input signal based on feedback control data from the eye optimization circuitry 106. The eye height optimization circuitry 204 is configured to compensate for offsets, adjust the eye amplitude to a specified height, and adjust the sampling point to an optimal position. The eye height optimization circuitry 204 provides center and edge samples of the input signal to the eye width optimization circuitry 206. The eye width optimization circuitry 206 is configured to adjust the eye width to a maximum degree. Examples of the eye height optimization circuitry 204 and the eye width optimization circuitry 206 are discussed below.

Figure 3:
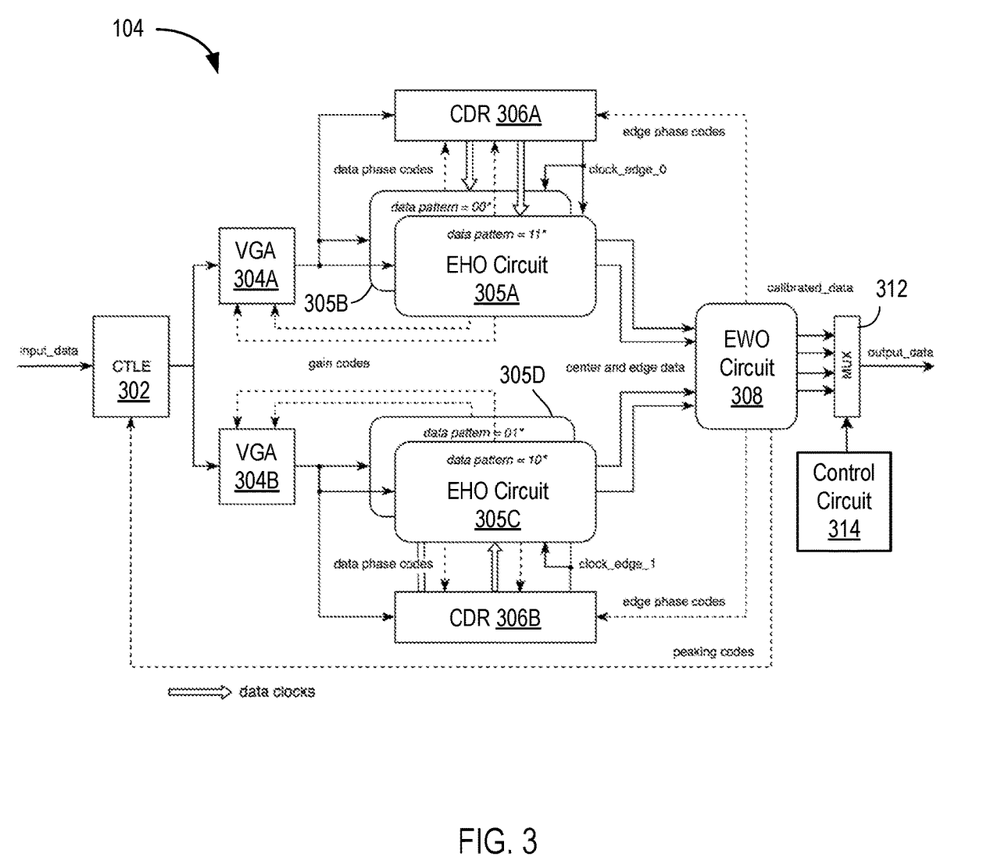
FIG. 3 is a block diagram depicting the receiver of FIG. 2 in more detail according to an embodiment.

FIG. 3 is a block diagram depicting the receiver 104 in more detail according to an embodiment. In the embodiment, the analog circuitry 202 includes a continuous time linear equalizer (CTLE) 302 and a pair of voltage gain amplifiers (VGAs) 304A and 304B (generally VGAs 304). The eye height optimization circuitry 204 includes eye height optimization (EHO) circuits 305A, 305B, 305C, and 305D (generally EHO circuits 305), and clock and data recovery (CDR) circuits 306A and 306B (generally CDR circuits 306). The eye width optimization circuitry 206 includes an eye width optimization (EWO) circuit 308, a multiplexer 312, and a control circuit 314.

An input of the CTLE 302 receives the input signal from the transmission medium 108. An output of the CTLE 302 is coupled to an input of the VGA 304A and an input of the VGA 304B. The CTLE 302 operates as a high-pass filter to compensate for the low-pass characteristics of the transmission medium 108. The CTLE 302 adjusts its peak frequency response based on information (peaking codes) provided by the EWO circuit 308 as discussed below. Each VGA circuit 304 receives the equalized analog signal from the CTLE 302. Each VGA circuit 304 adjusts the gain of the equalized signal based on information (gain codes) provided by the EHO circuits 305 as discussed further below. An output of the VGA circuit 304A is coupled to an input of the CDR circuit 306A, an input of the EHO circuit 305A, and an input of the EHO circuit 305B. An output of the VGA circuit 304B is coupled to an input of the CDR circuit 306B, an input of the EHO circuit 305C, and an input of the EHO circuit 305D.

Outputs of the EHO circuits 305 are coupled to inputs of the EWO circuit 308. Each CDR circuit 306A and 306B is configured to recover clock signals (data clocks and an edge clock) from the analog signal provided by the respective VGAs 304A and 304B. The CDR circuit 306A provides data clocks and an edge clock (clock_edge_0) to the EHO circuits 305A and 305B. The CDR circuit 306B provides data clocks and an edge clock (clock_edge_1) to the EHO circuits 305C and 305D. The EHO circuit 305A feeds back information (data phase codes) to the CDR 306A for adjusting the phase of the data clocks generated by the CDR 306A. The EHO circuit 306B feeds back information (data phase codes) to the CDR 306B for adjusting the phase of the data clocks generated by the CDR 306B. Each of the EHO circuits 305 generates center and edge samples of the analog signal assuming a particular data pattern. In the example shown, the EHO circuit 305A assumes the data pattern "11", the EHO circuit 305B assumes the data pattern "00", the EHO circuit 305C assumes the data pattern "10", and the EHO circuit 305D assumes the data pattern "01". Each of the EHO circuits 305 compensates for latch and offsets (via offset codes), adjusts eye amplitude to a specified height (via the gain codes), and adjusts the sampling point of the eye center to an optimal position (via the data phase codes) for its respective data pattern. The EHO circuits 305 provide the clock and data samples to the EWO circuit 308.

The EWO circuit 308 is configured to process the data and edge samples and feed back information (edge phase codes) to the CDR 306A and the CDR 306B, and information (peaking codes) to the CTLE 302. The EWO circuit 308 generates the edge phase codes to control the phase of the edge clocks generated by the CDR circuits 306, and the peaking codes to control the peak frequency response of the CTLE 302. The EWO circuit 308 is configured to generate the edge phase codes and the peaking codes to adjust the eye width to a maximum degree. The EWO circuit 308 provides the data samples to the inputs of the multiplexer 312. The multiplexer 312 selects one of the data samples as the output sample based on a control signal supplied by the control circuit 314.

Figure 4:
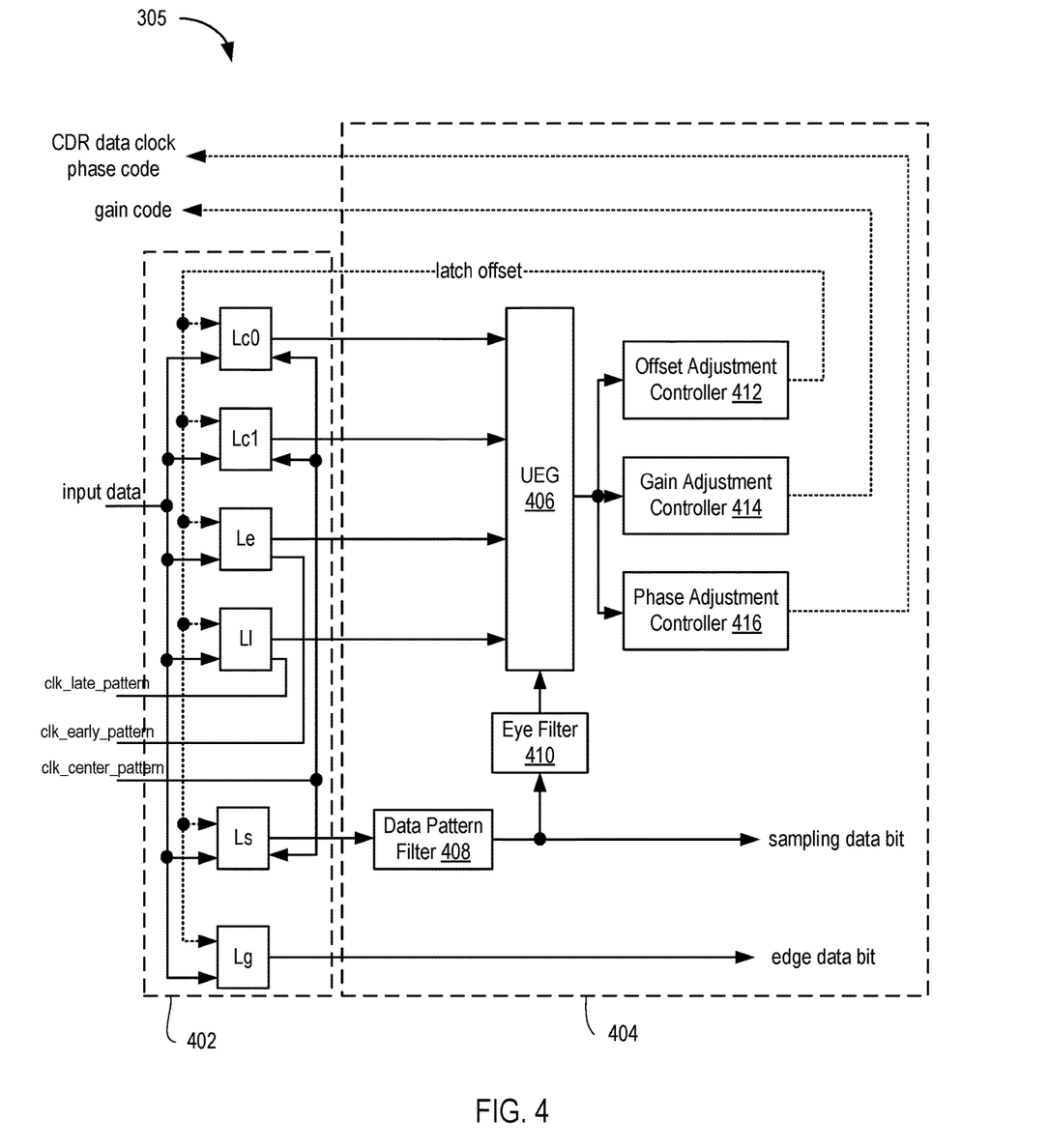
FIG. 4 is a block diagram depicting an eye height optimization circuit according to an embodiment.

FIG. 4 is a block diagram depicting an EHO circuit 305 according to an embodiment. The EHO circuit 305 includes latches 402 and control circuitry 404. The latches 402 include latches $L_{c0}$, $L_{c1}$, $L_e$, $L_l$, $L_s$, and $L_g$. The control circuitry 404 includes a uniform event generator (UEG) circuit 406, a data pattern filter 408, an eye filter 410, an offset adjustment controller 412, a gain adjustment controller 414, and a phase adjustment controller 416. Data inputs of the latches $L_{c0}$, $L_{c1}$, $L_e$, $L_l$, $L_s$, and $L_g$ receive the analog input signal to be sampled. A clock input of the latch $L_l$ receives a late data clock (clock_late_pattern). A clock input of the latch $L_e$ receives an early data clock (clock_early_pattern). Clock inputs of the latches $L_{c0}$, $L_{c1}$, and $L_s$ receive a center data clock (clock_center_pattern). A clock input of the latch $L_g$ receives an edge clock (clock_edge_0/1). The clock_late_pattern, clock_early_pattern, and clock_center_pattern are data clocks generated by the respective CDR circuit 305. Data outputs of the latches $L_{c0}$, $L_{c1}$, $L_e$, and $L_l$ are coupled to inputs of the UEG circuit 406. An output of the UEG circuit 406 is coupled to an input of the offset adjustment controller 412, an input of the gain adjustment controller 414, and an input of the phase adjustment controller 416. A data output of the latch $L_s$ is coupled to an input of the data pattern filter 408. An output of the data pattern filter 408 provides the sampled data bit. An input of the eye filter 410 receives the sampled data bit from the data pattern filter 408. An output of the eye filter 410 is coupled to an input of the UEG 406. An output of the latch $L_g$ provides the sampled edge bit. An output of the phase adjustment controller 416 provides a data phase code to a respective CDR 305. An output of the gain adjustment controller 414 provides a gain code to a respective VGA 304. An output of the offset adjustment controller 412 is coupled to an offset input of each of the latches 402.

In operation, the latches $L_{c0}$, $L_{c1}$, and $L_s$ sample the center of the data eye, the latch $L_e$ samples earlier than the center of the data eye, and the latch $L_l$ samples later than the center of the data eye. The latch $L_g$ samples the edge of the data eye. The latches 402 are offset to positive or negative data amplitude based on output of the offset adjustment controller 412. The UEG circuit 406 controls offset, gain, and phase tuning through statistics of 0's and 1's from the latches $L_{c0}$, $L_{c1}$, $L_e$, and $L_l$. The gain adjustment controller 416 adjusts the input signal amplitude. The phase adjustment controller 416 adjusts the phases of the early, center, and late data clocks. The pattern filter 408 filters the output of the latch $L_s$ to detect a particular pattern (e.g., 00*, 11*, 01*, or 10*). The eye filter 410 filters the output of the data pattern generator 408 to detect patterns based on the pattern of the pattern filter 408 (e.g., 0010/0000 for a pattern filter 00*; 1101/1111 for a pattern filter of 11*; 0101/0111 for a pattern filter of 01*; and 1010/1000 for a pattern filter of 10*).

Figure 5:
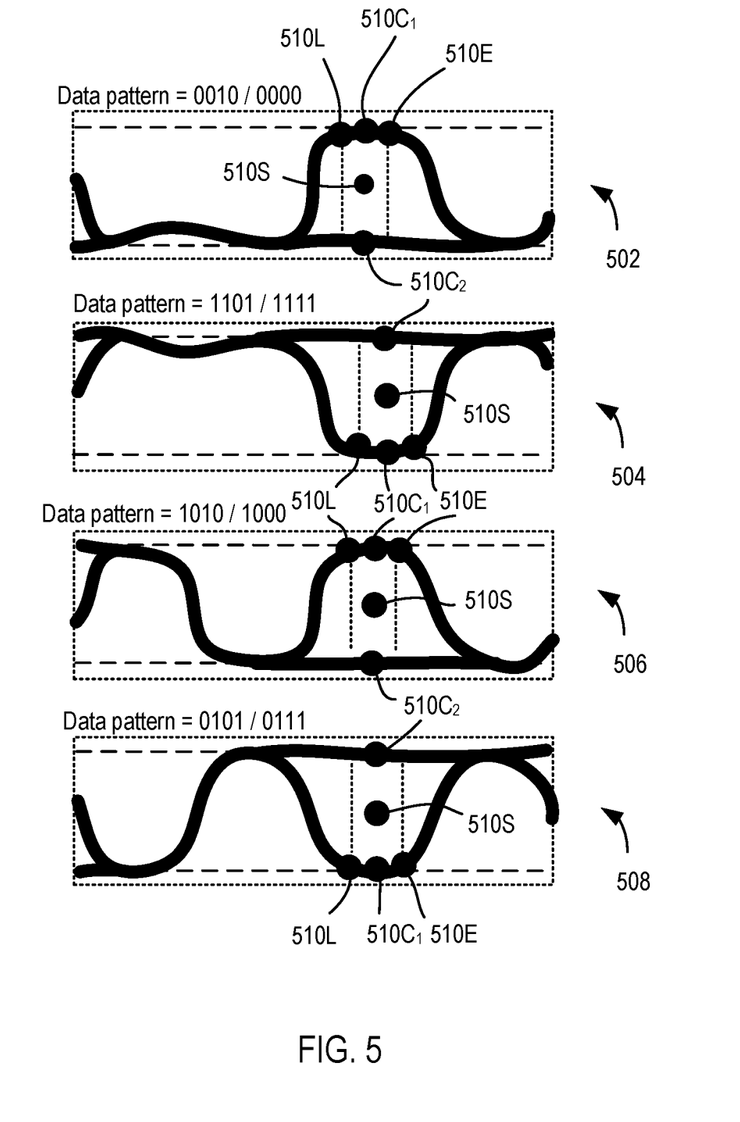
FIG. 5 shows eye diagrams and data latch positions for various data patterns according to an embodiment.

FIG. 5 shows eye diagrams and data latch positions for various data patterns according to an embodiment. An eye diagram 502 shows sampling latch position for data patterns 0010 or 0000. An eye diagram 504 shows sampling latch position for data patterns 1101 or 1111. An eye diagram 506 shows sampling latch position for data patterns 1010 or 1000. An eye diagram 508 shows sampling latch position for data patterns 0101 or 0111. Point 510L shows the position of the latch $L_l$. Point $510C_1$ shows the position of the latch $L_{c1}$. Point 510E shows the position of the latch $L_e$. Point 510S shows the position of the latch $L_s$. Point $510C_2$ shows the position of the latch $L_{c2}$. The latches $L_{c0}$ and $L_l$ specify the height in which the signal is adjusted to fit. The latches $L_{c1}$, $L_e$, and $L_l$ track the actual peak point of the current eye pattern. The latch $L_s$ provides the data sample and is located in the center (in terms of amplitude) between $L_{c1}$ and $L_{c1}$.

Figure 6:
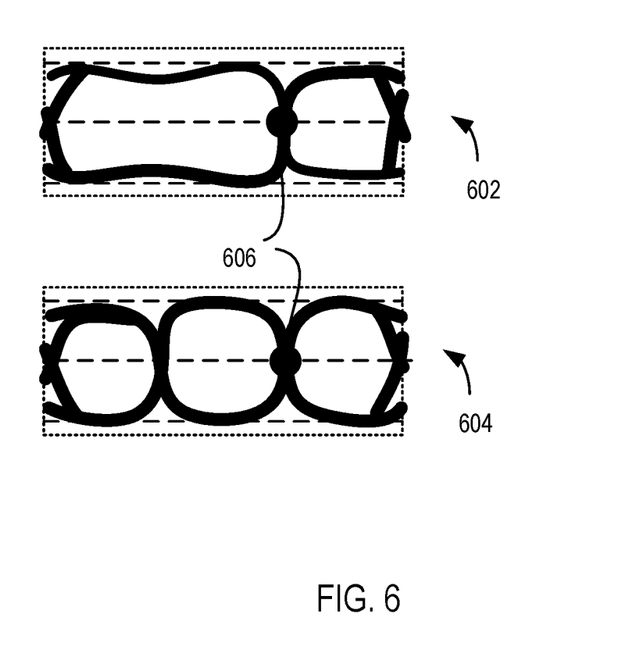
FIG. 6 shows eye diagrams and an edge latch position for a pair of data patterns according to an embodiment.

FIG. 6 shows eye diagrams and an edge latch position for a pair of data patterns according to an embodiment. A combined eye diagram 602 shows edge latch position for data patterns 00* or 11*. A combined eye diagram 604 shows edge latch position for data patterns 01* or 10*. A point 606 shows the position of the latch $L_g$. The latch $L_g$ tracks the data edge of the current pattern and provides data peaking information through comparison with CDR edge tracking.

Returning to FIG. 4, the UEG 406 tracks three events designated $E_0$, $E_1$, and $E_d$. The UEG 406 functions as follows: if the latch $L_{c0}$ outputs more 0's than 1's, then the event $E_0$ is 0, otherwise the event $E_0$ is 1. If the latch $L_{c1}$ outputs more 0's than 1's, then the event $E_1$ is 0, otherwise the event $E_1$ is 1. If the latch $L_e$ outputs more 0's than the latch $L_l$, then the event $E_d$ is 0, otherwise the event $E_d$ is 1. Consider the tuple $\{E_1, E_0, E_d\}$. For the tuple $\{0,0,0\}$, the phase adjustment controller 416 shifts data phase in the positive direction and the offset adjustment controller 412 decreases the offset. For the tuple $\{0,0,1\}$, the phase adjustment controller 416 shifts data phase in the negative direction and the offset adjustment controller 412 decreases the offset. For the tuple $\{0,1,0\}$, the gain adjustment controller 414 increases gain and the phase adjustment controller 416 adjusts data phase in the positive direction. For the tuple $\{0,1,1\}$, the gain adjustment controller 414 increases gain and the phase adjustment controller 416 adjusts data phase in the negative direction. For the tuple $\{1,0,0\}$, the gain adjustment controller 414 decreases gain and the phase adjustment controller 416 adjusts data phase in the positive direction. For the tuple $\{1,0,1\}$, the gain adjustment controller 414 decreases gain and the phase adjustment controller 416 adjusts data phase in the negative direction. For the tuple $\{1,1,0\}$, the phase adjustment controller 416 shifts data phase in the positive direction and the offset adjustment controller 412 increases the offset. For the tuple $\{1,1,1\}$, the phase adjustment controller 416 shifts data phase in the negative direction and the offset adjustment controller 412 increases the offset.

Figure 7:
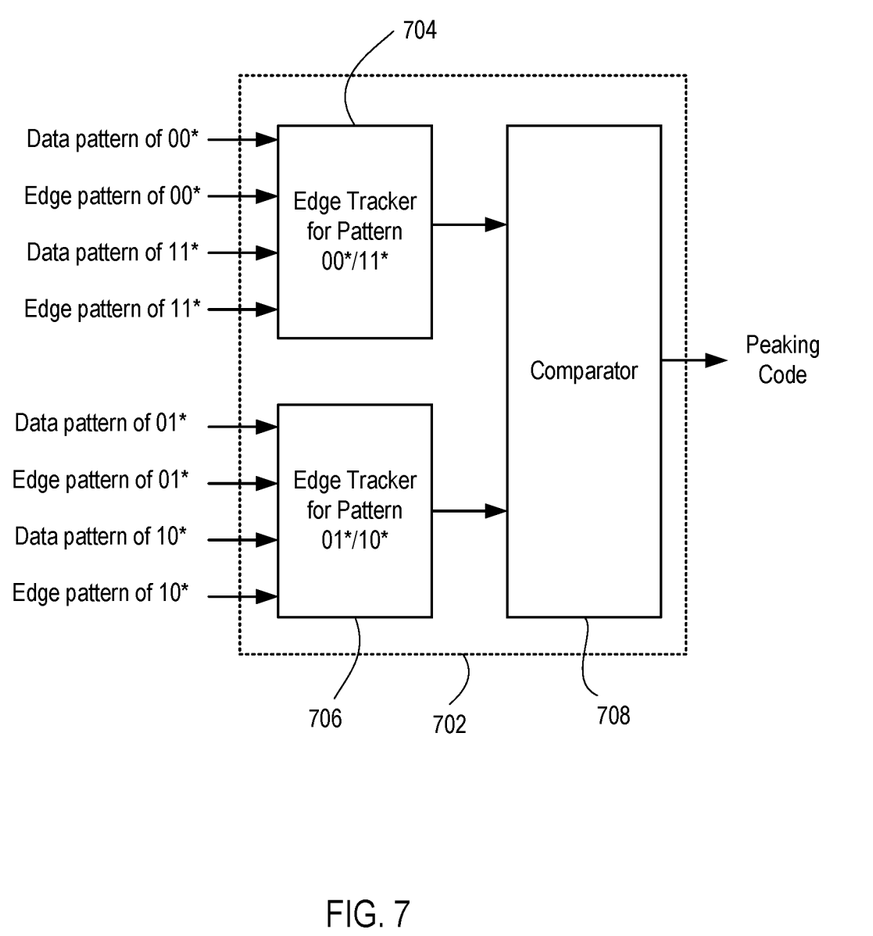
FIG. 7 is a block diagram depicting circuitry of an eye width optimization circuit for generating the peaking codes and edge phase codes according to an embodiment.

FIG. 7 is a block diagram depicting circuitry 702 of the EWO circuit 308 for generating the peaking codes and edge phase codes according to an embodiment. The circuitry 702 includes edge tracking circuits 704 and 706 and a comparator 708. The edge tracking circuit 704 receives data and edge samples of the pattern 00*, and the data and edge samples of the pattern 11*. The edge tracking circuit 706 receives data and edge samples of the pattern 01*, and the data and edge samples of the pattern 10*. The edge tracking circuit 704 performs edge tracking for the pattern 00*/11*. The edge tracking circuit 706 performs edge tracking for the pattern 01*/10*. The edge tracking circuit 704 outputs a phase of the edge clock clock_edge_0. The edge tracking circuit outputs a phase of edge clock clock_edge_1. The comparator 708 compares the two phase values and outputs a peaking code. The edge tracking circuit 704 provides the phase of clock_edge_0 to the CDR 306A. The edge tracking circuit 706 provides the phase of clock_edge_1 to the CDR 306B. The comparator 708 provides the peaking code to the CTLE 302. In operation, if the phase of clock_edge_0 is greater than the phase of clock_edge_1, this indicates an underpeak event. If the phase of clock_edge_0 is less than the phase of clock_edge_1, this indicates an overpeak event. The circuitry 702 operates to compensate for underpeaking or overpeaking events by adjusting the relative phase of the edge clocks, as well as the peaking code.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A receiver, comprising:
analog circuitry configured to equalize and amplify an input signal and provide an analog signal as output;
clock data recovery (CDR) circuitry configured to recover data clocks and edge clocks from the analog signal;
a plurality of eye height optimization circuits, each of the plurality of eye height optimization circuits configured to, based on a respective data pattern of a plurality of data patterns, sample the analog signal based on the data clocks and the edge clocks, feed back first information to the analog circuitry for adjusting the eye amplitude, and feed back second information to the CDR circuitry for adjusting the data clocks; and
an eye width optimization circuit configured to receive data and edge samples from the plurality of eye height optimization circuits, feed back third information to the CDR circuitry to adjust the edge clocks, and feed back fourth information to the analog circuitry to adjust the equalization.

2. The receiver of claim 1, wherein the analog circuitry comprises:
a continuous time linear equalizer (CTLE) configured to receive the input signal and the fourth information; and
variable gain amplifier (VGA) circuitry configured to amplify output of the CTLE to provide the analog signal and receive the second information.

3. The receiver of claim 2, wherein the VGA circuitry includes a first VGA circuit and a second VGA circuit, wherein the plurality of eye height optimization circuits includes a first pair of eye height optimization circuits coupled to the first VGA circuit and a second pair of eye height optimization circuits coupled to the second VGA circuit, and wherein the CDR circuitry includes a first CDR coupled to the first pair of eye height optimization circuits and a second CDR coupled to the second pair of eye height optimization circuits.

4. The receiver of claim 3, wherein the first information comprises first gain codes for the first VGA circuit and second gain codes for the second VGA circuit, and wherein the second information comprises first data phase codes for the first CDR and second data phase codes for the second CDR.

5. The receiver of claim 3, wherein the third information comprises first edge phase codes for the first CDR and second edge phase codes for the second CDR.

6. The receiver of claim 3, wherein the eye width optimization circuit comprises:
a first edge tracking circuit coupled to output of the first pair of eye height optimization circuits;
a second edge tracking circuit coupled to output of the second pair of eye height optimization circuits; and
a comparator coupled to outputs of the first and second edge tracking circuits.

7. The receiver of claim 1, wherein each of the plurality of eye height optimization circuits comprises:
a plurality of latches;
a uniform event generator (UEG) coupled to a first set of the plurality of latches;
a plurality of controllers coupled to output of the UEG;
a data pattern filter coupled to output of one of the plurality of lathes; and
an eye filter coupled to output of the data pattern filter and an input of the UEG.

8. A serial communication system, comprising:
a transmitter;
a transmission medium coupled to the transmitter; and
a receiver coupled to the transmission medium to receive an input signal from the transmitter, the receiver comprising:
analog circuitry configured to equalize and amplify the input signal and provide an analog signal as output;
clock data recovery (CDR) circuitry configured to recover data clocks and edge clocks from the analog signal;
a plurality of eye height optimization circuits, each of the plurality of eye height optimization circuits configured to, based on a respective data pattern of a plurality of data patterns, sample the analog signal based on the data clocks and the edge clocks, feed back first information to the analog circuitry for adjusting the eye amplitude, and feed back second information to the CDR circuitry for adjusting the data clocks; and
an eye width optimization circuit configured to receive data and edge samples from the plurality of eye height optimization circuits, feed back third information to the CDR circuitry to adjust the edge clocks, and feed back fourth information to the analog circuitry to adjust the equalization.

9. The system of claim 8, wherein the analog circuitry comprises:
a continuous time linear equalizer (CTLE) configured to receive the input signal and the fourth information; and variable gain amplifier (VGA) circuitry configured to amplify output of the CTLE to provide the analog signal and receive the second information.

10. The system of claim 9, wherein the VGA circuitry includes a first VGA circuit and a second VGA circuit, wherein the plurality of eye height optimization circuits includes a first pair of eye height optimization circuits coupled to the first VGA circuit and a second pair of eye height optimization circuits coupled to the second VGA circuit, and wherein the CDR circuitry includes a first CDR coupled to the first pair of eye height optimization circuits and a second CDR coupled to the second pair of eye height optimization circuits.

11. The system of claim 10, wherein the first information comprises first gain codes for the first VGA circuit and second gain codes for the second VGA circuit, and wherein the second information comprises first data phase codes for the first CDR and second data phase codes for the second CDR.

12. The system of claim 10, wherein the third information comprises first edge phase codes for the first CDR and second edge phase codes for the second CDR.

13. The system of claim 10, wherein the eye width optimization circuit comprises:
   a first edge tracking circuit coupled to output of the first pair of eye height optimization circuits;
   a second edge tracking circuit coupled to output of the second pair of eye height optimization circuits; and
   a comparator coupled to outputs of the first and second edge tracking circuits.

14. The system of claim 8, wherein each of the plurality of eye height optimization circuits comprises:
   a plurality of latches;
   a uniform event generator (UEG) coupled to a first set of the plurality of latches;
   a plurality of controllers coupled to output of the UEG;
   a data pattern filter coupled to output of one of the plurality of lathes; and
   an eye filter coupled to output of the data pattern filter and an input of the UEG.

15. A method of receiving an input signal at a receiver, comprising:
   equalizing and amplifying, at analog circuitry, the input signal to provide an analog signal as output;
   recovering, at CDR circuitry, data clocks and edge clocks from the analog signal;
   sampling the analog signal based on the data clocks and the edge clocks using a plurality of eye height optimization circuits each based on a respective data pattern of a plurality of data patterns;
   providing, from the plurality of eye height optimization circuits, first information to the analog circuitry for adjusting the eye amplitude, and second information to the CDR circuitry for adjusting the data clocks;
   receiving, at eye width optimization circuitry, data and edge samples from the plurality of eye height optimization circuits; and
   providing, from the eye width optimization circuit, third information to the CDR circuitry to adjust the edge clocks, and fourth information to the analog circuitry to adjust the equalization.

16. The method of claim 15, wherein the analog circuitry comprises:
   a continuous time linear equalizer (CTLE) configured to receive the input signal and the fourth information; and
   variable gain amplifier (VGA) circuitry configured to amplify output of the CTLE to provide the analog signal and receive the second information.

17. The method of claim 16, wherein the VGA circuitry includes a first VGA circuit and a second VGA circuit, wherein the plurality of eye height optimization circuits includes a first pair of eye height optimization circuits coupled to the first VGA circuit and a second pair of eye height optimization circuits coupled to the second VGA circuit, and wherein the CDR circuitry includes a first CDR coupled to the first pair of eye height optimization circuits and a second CDR coupled to the second pair of eye height optimization circuits.

18. The method of claim 16, wherein the first information comprises first gain codes for the first VGA circuit and second gain codes for the second VGA circuit, and wherein the second information comprises first data phase codes for the first CDR and second data phase codes for the second CDR.

19. The method of claim 16, wherein the third information comprises first edge phase codes for the first CDR and second edge phase codes for the second CDR.

20. The method of claim 16, wherein the eye width optimization circuit comprises:
   a first edge tracking circuit coupled to output of the first pair of eye height optimization circuits;
   a second edge tracking circuit coupled to output of the second pair of eye height optimization circuits; and
   a comparator coupled to outputs of the first and second edge tracking circuits.

* * * * *